US007562528B2

(12) United States Patent
Wood

(10) Patent No.: US 7,562,528 B2
(45) Date of Patent: Jul. 21, 2009

(54) LOW-RESTRICTION TURBINE OUTLET HOUSING

(75) Inventor: Terry G. Wood, Countryside, IL (US)

(73) Assignee: International Engine Intellectual Property Company LLC, Warrenville, IL (US)

( * ) Notice: Subject to any disclaimer, the term of this patent is extended or adjusted under 35 U.S.C. 154(b) by 0 days.

(21) Appl. No.: 11/613,788

(22) Filed: Dec. 20, 2006

(65) Prior Publication Data

US 2008/0148728 A1 Jun. 26, 2008

(51) Int. Cl.

| | |
|---|---|
| ***F02D 23/00*** | (2006.01) |
| ***F01D 1/02*** | (2006.01) |
| ***F01D 9/00*** | (2006.01) |
| ***F01D 1/06*** | (2006.01) |
| ***F01D 1/14*** | (2006.01) |
| ***F01D 1/28*** | (2006.01) |
| ***F01D 5/04*** | (2006.01) |
| ***F16M 11/00*** | (2006.01) |

(52) U.S. Cl. ...................... 60/602; 415/211.2; 415/120; 415/203; 415/204; 248/671

(58) Field of Classification Search .................. 60/602, 60/612; 417/407, 94; 415/211.2, 120, 203, 415/204; 248/671
See application file for complete search history.

(56) References Cited

U.S. PATENT DOCUMENTS

| | | | | |
|---|---|---|---|---|
| 1,663,998 | A * | 3/1928 | Schmidt | 415/211.2 |
| 2,362,509 | A * | 11/1944 | Streid | 248/671 |
| 2,821,067 | A * | 1/1958 | Hill | 415/208.1 |
| 2,913,871 | A * | 11/1959 | Bradshaw | 415/211.2 |
| 3,167,917 | A * | 2/1965 | Alexandrescu | 60/361 |
| 3,221,983 | A * | 12/1965 | Trickler et al. | 415/211.2 |
| 3,274,757 | A * | 9/1966 | Wapler | 415/121.2 |
| 3,523,743 | A * | 8/1970 | Jolette | 415/211.2 |
| 3,552,877 | A * | 1/1971 | Christ et al. | 415/211.2 |
| 3,652,176 | A * | 3/1972 | Walsh | 415/205 |
| 3,802,187 | A * | 4/1974 | Titus | 415/211.2 |
| 4,196,593 | A * | 4/1980 | Froeliger | 60/612 |
| 4,308,718 | A * | 1/1982 | Mowill | 415/207 |
| 4,391,564 | A * | 7/1983 | Garkusha et al. | 415/211.2 |
| 4,676,717 | A * | 6/1987 | Willyard et al. | 417/407 |
| 7,093,589 | B2 * | 8/2006 | Sorersen et al. | 123/559.1 |

FOREIGN PATENT DOCUMENTS

| | | | |
|---|---|---|---|
| JP | 02102821 | A * | 4/1990 |
| SU | 715814 | A * | 2/1980 |
| SU | 1105680 | A * | 7/1984 |

* cited by examiner

*Primary Examiner*—Thai Ba Trieu
(74) *Attorney, Agent, or Firm*—Jack D. Nimz; Jeffrey P. Calfa

(57) ABSTRACT

A low-restriction turbine outlet device (200) includes a housing (202) having an internal volume (208). The internal volume (208) includes an inlet transition portion (230) and an outlet transition portion (232). An inlet port (204) that is formed in the housing (202) is in fluid communication with an outlet port (206) that is also formed in the housing (202). A mounting flange (216) is connected to the housing (202), a first set of stiffening ribs (218) and a second set of stiffening ribs (220) each connect the mounting flange (216) to the housing (202).

7 Claims, 2 Drawing Sheets

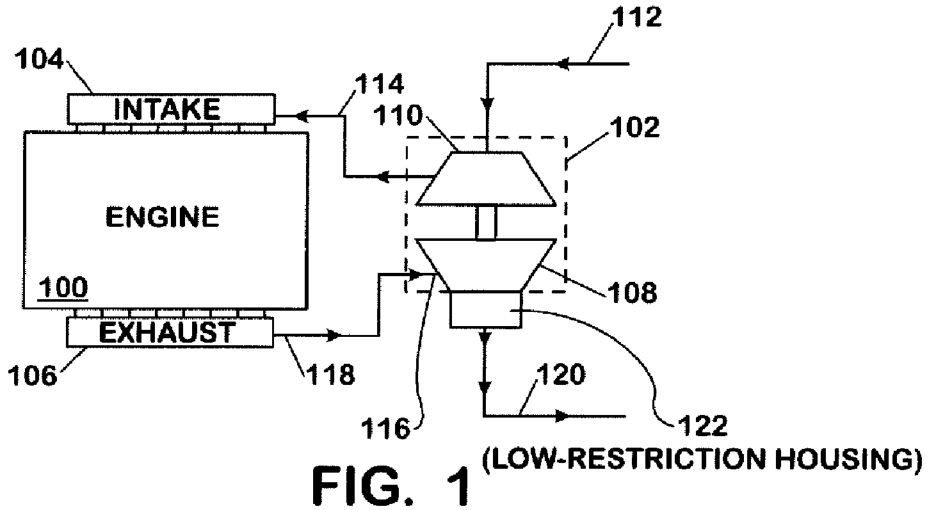
FIG. 1
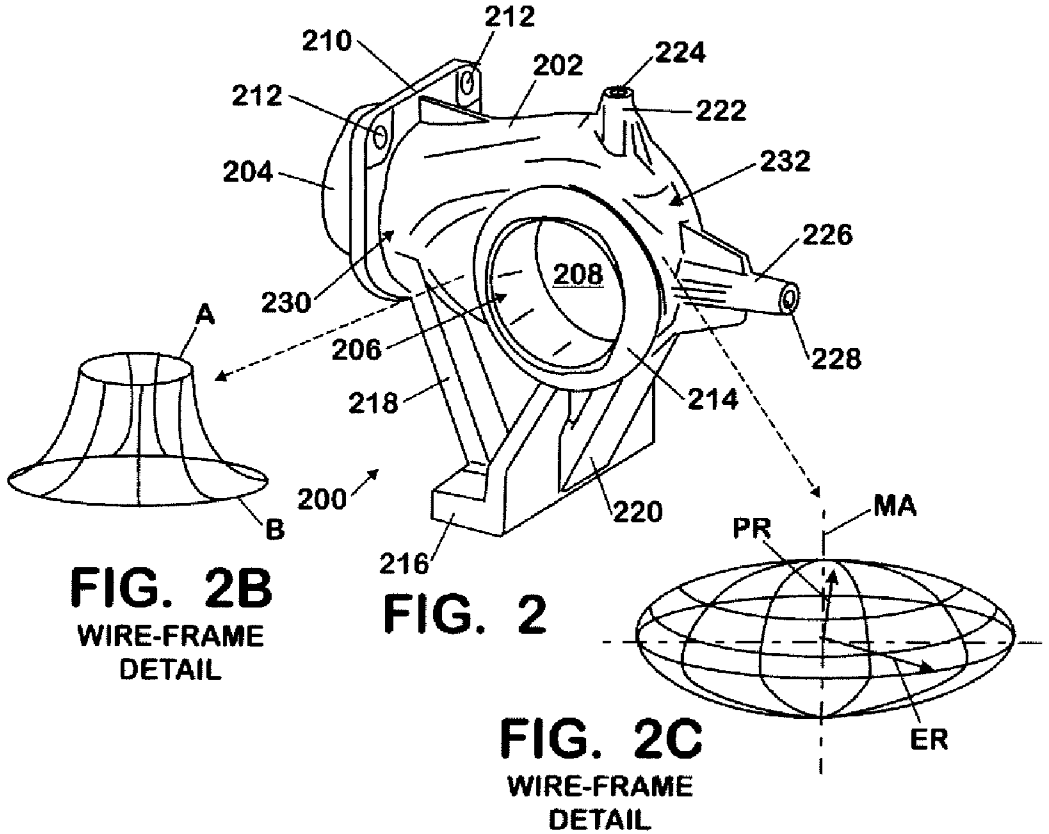
FIG. 2B
WIRE-FRAME DETAIL
FIG. 2
FIG. 2C
WIRE-FRAME DETAIL

LOW-RESTRICTION TURBINE OUTLET HOUSING

FIELD OF THE INVENTION

This invention relates to internal combustion engines, including but not limited to fluid passages for air and/or exhaust systems that are connected to an engine.

BACKGROUND OF THE INVENTION

Many engines employ devices associated with their intake air or exhaust gas systems that promote flow therethrough to improve a performance of the engines. Examples of such devices include turbochargers, superchargers, and the like. A turbocharger, for example, may include a turbine that is connected to an exhaust system of an engine, and used to operate a compressor connected thereto that promotes the flow of air into the engine. Flow conditions of air and/or exhaust gas in and out of the turbocharger, and any obstructions to flow that may be associated therewith, may affect a performance of the turbocharger, and thus, a performance of the engine that is associated therewith. Often, flow obstructions to air and/or exhaust gas passages in and out of the turbocharger are the result of space constraints that are present when connecting the turbocharger to the engine.

Accordingly, there is a need for low obstruction air and/or fluid passages that are associated with turbochargers, or other devices, when they are attached to an engine that has limited space available.

SUMMARY OF THE INVENTION

A low-restriction turbine outlet device includes a housing having an internal volume. The internal volume includes an inlet transition portion and an outlet transition portion. An inlet port that is formed in the housing is in fluid communication with an outlet port that is also formed in the housing. A mounting flange is connected to the housing, a first set of stiffening ribs and a second set of stiffening ribs each connect the mounting flange to the housing.

BRIEF DESCRIPTION OF THE DRAWINGS

FIG. 1 is a block diagram of an engine having a turbocharger operably connected thereto, the turbocharger having a low-restriction gas outlet device connected thereto in accordance with the invention.

FIG. 2 and FIG. 3 are outline views from difference perspectives of a low-restriction passage in accordance with the invention.

FIG. 2B and FIG. 2C are wire-frame details for three-dimensional shapes used in the low-restriction gas outlet device in accordance with the invention.

DESCRIPTION OF A PREFERRED EMBODIMENT

Figure 3:
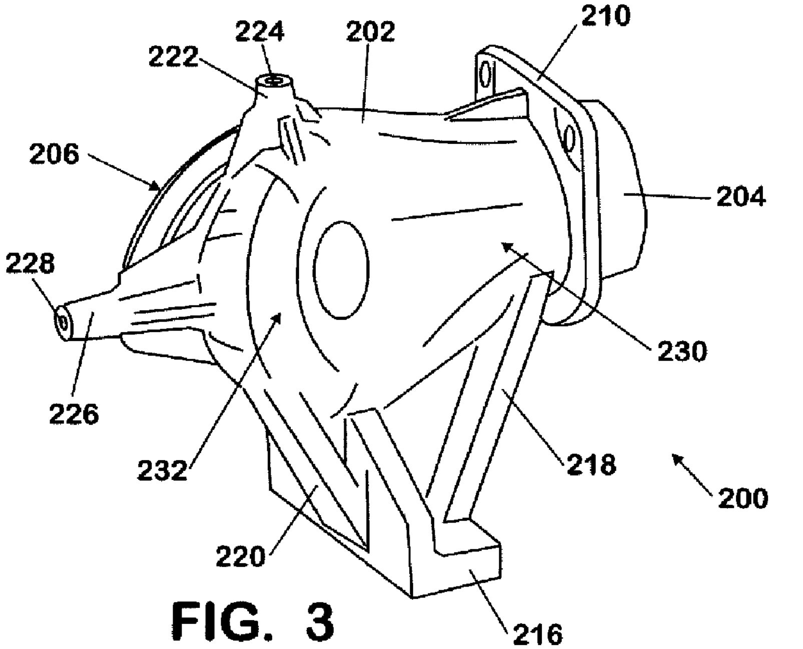

The following describes an apparatus for and method of providing a low obstruction fluid passage for a turbocharger that is associated with an internal combustion engine. A block diagram of an engine 100 having a turbocharger 102 associated therewith is shown in FIG. 1. The engine 100 may be connected to an intake system 104 and exhaust system 106. The turbocharger 102 may include a turbine 108 and a compressor 110. The turbine 108 may be in fluid communication with the exhaust system 106, and the compressor 110 may be fluidly connected to the intake system 104.

During operation of the engine 100, air may enter the compressor 110 through a low-pressure air inlet passage 112. The air may be compressed in the compressor 110 and communicated to the intake 104 through a high-pressure air passage 114. The high-pressure air passage 114 may optionally contain a charge air cooler (not shown) or other devices. The flow of the air through the compressor 110 is denoted with arrows.

Air from the intake 104 may enter at least one combustion chamber (not shown) in the engine 100, where it may mix with fuel and combust. One product of the combustion of the air and fuel is exhaust gas, that may exit the combustion cylinder and be collected in the exhaust system 106. The exhaust gas from the exhaust system 106 may be communicated to an inlet 116 of the turbine 108 through a high-pressure exhaust passage 118. The exhaust gas from the high-pressure exhaust passage 118 may cause a turbine wheel (not shown) to rotate and generate power that is used to operate the compressor 110.

The exhaust gas may exit the turbine 108 via a low-pressure exhaust passage 120. The exhaust gas exiting the turbine 108 may possess flow characteristics, for example a high state of turbulence and swirl, that have been imparted thereto by the rotation of the turbine wheel inside the turbine 108 during operation of the engine 100. For this reason, the high-pressure exhaust passage 120 must be arranged such that the flow of exhaust gas exiting the turbine 108 is not substantially impeded by flow restrictions that may decrease an operating efficiency of the turbine 108.

Most known engine configurations use a circular pipe that has been bent into a desired shape and connected to a turbine outlet to provide the high-pressure exhaust passage therefor. A circular pipe of constant cross-section may not sufficiently allow any swirling flow characteristics of exhaust gas at an exit of a turbine to sufficiently settle so that they can be removed from the turbine without causing a loss of performance for the turbine. A low-restriction passage 122 may advantageously be connected to the outlet of the turbine 108, between the turbine 108 and the high-pressure exhaust passage 120, to permit a suitable transition for exhaust gas exiting the turbine 108 to enter the high-pressure exhaust passage 120. A special advantage may be realized when a sharp turn is required in the high-pressure exhaust passage 120 close to the outlet of the turbine 108. In this case, the low-restriction passage 122 is capable of providing a low-restriction solution that does not lessen the efficiency of the turbine 108 when compared to traditional configurations.

An outline view of a low-restriction passage 200 for use with a turbine is shown in FIG. 2. The passage may include a housing 202 that forms a gas inlet port 204 and a gas outlet port 206, both in fluid communication to each other through an internal volume 208 that is formed in the housing 202. An inlet flange 210 that includes a plurality of bolt openings 212 may be located around the inlet port 204 and be arranged and constructed to sealably engage a mating surface of a turbine outlet (not shown). An outlet flange 214 may surround the outlet port 206 and be arranged to sealably engage a low-pressure exhaust gas outlet passage (not shown), which may be for example a pipe having a circular cross-section and a flared end for connection to the outlet flange 214 with a V-band clamp (not shown).

The housing 202 may also form a mounting flange 216 that may be used to mount the housing 202 to an engine. A first stiffening set of ribs 218, and a second stiffening set of ribs 220, may each connect the mounting flange 216 to other areas of the housing 202, to provide stiffening and support against vibration of the housing 202 as mounted on an engine during service. The housing may include additional features formed thereon, for example, a first boss 222 having a fastener opening 224 formed therein, and a second boss 226 having an additional fastener opening 228 formed therein. The fastener opening 224 and additional fastener opening 228 may be useful in connecting other components to the housing 202 and to the engine, such as, heat shields, brackets, and so forth.

The internal volume 208 and the housing 202 that forms it, may include two main portions that have fundamentally different shapes. An inlet transition portion 230 may have a truncated-elliptical-conoid shape, with its vertex truncated by the inlet port 204, and its base oriented to open toward the outlet port 206. The truncated-elliptical-conoid shape of the inlet transition portion 230 may be modified to have a more circular cross-section "A" toward the vertex in order to provide a circular shape close to the inlet port 204, and a base "B" having a more elliptical shape, as shown in the wire-frame detail of FIG. 2B. An outlet transition portion 232 may have an oblate-ellipsoid shape and lie between the inlet transition portion 230 and the outlet port 206. The shape of the outlet transition portion 232 can also be described as a "squashed" spheroid for which the equatorial radius "ER" is greater than the polar radius "PR", and which may be created by rotating an ellipse about its minor axis "MA" as shown in the wire-frame detail of FIG. 2C. The outlet transition portion 232 may have its equatorial plane substantially parallel to a perimeter of the outlet port 206, as shown.

A different outline view of the low-restriction passage 200 is shown in FIG. 3. As seen from this perspective, the combination of the inlet transition portion 230 and the outlet transition portion 232 that is formed in the housing 202 may have a "tear drop" shape with the oblate-ellipsoid being on one end close to the outlet port 206 and merging with the truncated-elliptical-conoid shape on another end that is close to the inlet port 204.

Figure 4:
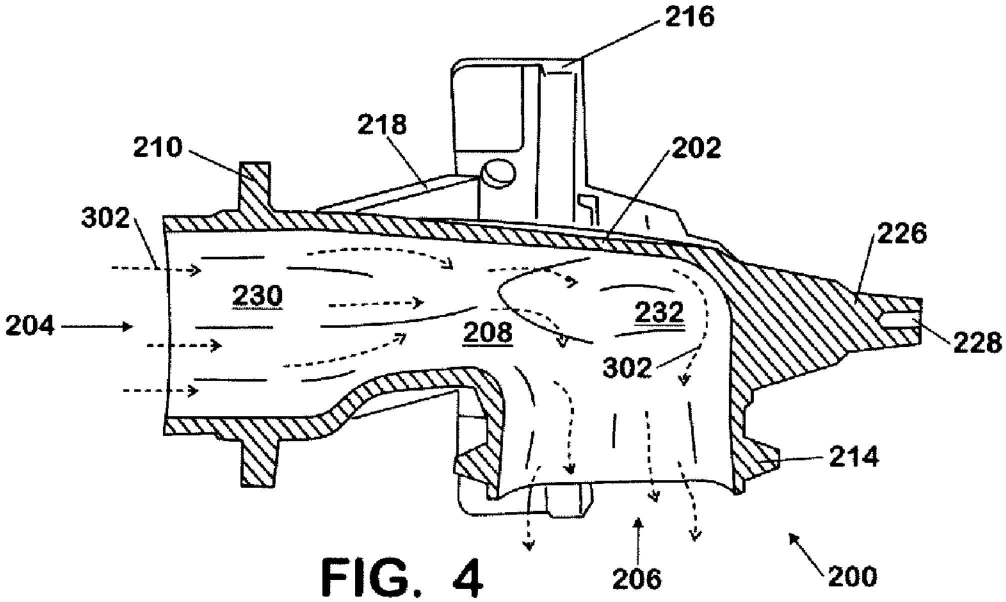
FIG. 4 is a cross-section view of a housing for a low-restriction device in accordance with the invention.

A cross-section view of the housing 202 is shown in FIG. 4. The flow of exhaust gas through the housing 202 during operation is denoted by dotted-line arrows. Whenever an engine operates, exhaust gas is produced. The exhaust gas may pass through a turbine, and exit the turbine through a gas outlet. The housing 202 may be connected to the turbine (connection to the turbine not shown) and be arranged to receive exhaust gas therefrom through the inlet port 204. When exhaust gas enters the housing 202 through the inlet port 204, an exhaust gas flow 302 (denoted by the dotted-line arrows) may be highly turbulent and have a general swirl structure. The flow 302 may enter the internal volume 208 of the housing 202, and be expanded or funneled by the inlet transition portion 230 toward a center region of the volume 208. The flow may exit the inlet transition portion 230 and enter the outlet transition portion 232. Due to the shape of the inlet transition portion 230 and the outlet transition portion 232 of the volume 208, the flow 302 may advantageously be allowed to develop its swirl structure unhindered without, advantageously, losing an appreciable amount of flow momentum.

The flow 302 may thusly effectively negotiate a turn, in the example shown an angle of about 90 degrees that exists in the housing 202 between the inlet port 204 and the outlet port 206, without an appreciable increase in pressure loss. The exhaust flow 302 may exit the housing 202 through the outlet port 206. A substantially unhindered passage of the flow 302 through the housing 202 is advantageous because there is no appreciable increase in pressure at the outlet of the turbine, or alternatively, at the inlet port 204 with respect to the outlet port 206. In this manner, an efficiency of the turbine is maintained. Moreover, a structural rigidity of the housing 202 when connected to an engine, a turbine, and a low-pressure exhaust passage may increase an overall rigidity of the turbine as mounted onto the engine and decrease the overall Noise Vibration and Harshness (NVH) performance of the engine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of negotiating a turn in a low-flow-restriction fashion with a flow of exhaust gas that is exiting a turbine in a highly turbulent condition that has a general swirl structure, comprising the steps of:
- sealably routing the flow of exhaust gas from a gas outlet of the turbine into an inlet port of a housing;
- expanding and funneling the flow of exhaust gas in an inlet transition portion of an internal volume that is formed in the housing, wherein the inlet transition portion has an elliptical-conoid shape;
- passing the flow of exhaust gas out of the inlet transition portion into an outlet transition portion of the internal volume, wherein the outlet transition portion has an oblate-ellipsoid shape;
- exiting the flow of exhaust gas from the housing through an outlet port that fluidly communicates with the outlet transition portion, wherein the outlet port is at an angle with respect to the inlet port; and
- providing a structural rigidity to the turbine with the housing when the housing is connected to the turbine and to an engine.

2. A low-restriction turbine outlet device, comprising:
- a housing having an internal volume, wherein the internal volume includes an inlet transition portion and an outlet transition portion;
- an inlet port formed in the housing that is in fluid communication with an outlet port formed in the housing;
- a mounting flange connected to the housing;
- a first set of stiffening ribs that connect the mounting flange to the housing;
- a second set of stiffening ribs that connect the mounting flange to the housing; and
- wherein the inlet transition portion has an elliptical-conoid shape, wherein the elliptical-conoid shape defines a vertex and a base, wherein the vertex is truncated by the inlet port, and wherein the base is oriented toward the outlet port.

3. A low-restriction turbine outlet device, comprising:
- a housing having an internal volume, wherein the internal volume includes an inlet transition portion and an outlet transition portion;
- an inlet port formed in the housing that is in fluid communication with an outlet port formed in the housing;
- a mounting flange connected to the housing;
- a first set of stiffening ribs that connect the mounting flange to the housing;
- a second set of stiffening ribs that connect the mounting flange to the housing; and
- wherein the outlet transition portion has an oblate-ellipsoid shape, wherein the oblate-ellipsoid shape has an equatorial radius and a polar radius, wherein the equatorial radius is greater than the polar radius.

4. The low-restriction turbine outlet device of claim 3, wherein the equatorial radius defines a plane, and wherein the plane is substantially parallel to a perimeter of the outlet port.

5. An internal combustion engine, comprising:

an intake system that is in intermittent fluid communication with at least one combustion cylinder during operation of the engine;

an exhaust system that is in intermittent fluid communication with the combustion cylinder during operation of the engine;

a turbocharger operably connected to the engine, the turbocharger comprising a compressor having an air inlet and an air outlet, wherein the air outlet is in fluid communication with the intake system; and a turbine having a gas inlet and a gas outlet, wherein the gas inlet is in fluid communication with the exhaust system;

a low-restriction turbine outlet device connected to the turbine, wherein the low-restriction turbine outlet device comprises a housing having an inlet port in fluid communication with the gas outlet of the turbine;

an outlet port in fluid communication with the inlet port via an internal volume that is formed into the housing; and wherein the inlet transition portion has a an elliptical-conoid shape, wherein the elliptical-conoid shape defines a vertex and a base, wherein the vertex is truncated by the inlet port, and wherein the base is oriented toward the outlet port.

6. An internal combustion engine, comprising:

an intake system that is in intermittent fluid communication with at least one combustion cylinder during operation of the engine;

an exhaust system that is in intermittent fluid communication with the combustion cylinder during operation of the engine;

a turbocharger operably connected to the engine, the turbocharger comprising a compressor having an air inlet and an air outlet, wherein the air outlet is in fluid communication with the intake system; and a turbine having a gas inlet and a gas outlet, wherein the gas inlet is in fluid communication with the exhaust system;

a low-restriction turbine outlet device connected to the turbine, wherein the low-restriction turbine outlet device comprises a housing having an inlet port in fluid communication with the gas outlet of the turbine;

an outlet port in fluid communication with the inlet port via an internal volume that is formed into the housing; and wherein the outlet transition portion has an oblate-ellipsoid shape, wherein the oblate-ellipsoid shape has an equatorial radius and a polar radius, wherein the equatorial radius is greater than the polar radius.

7. The internal combustion engine of claim 6, wherein the equatorial radius defines a plane, and wherein the plane is substantially parallel to a perimeter of the outlet port.

* * * * *